United States Patent Office 3,322,700
Patented May 30, 1967

3,322,700
METHOD OF FOAMING A RESIN COMPOSITION COMPRISING AN EPOXY RESIN, A VAPOR GENERATING FLUID, BORON TRIFLUORIDE CATALYST AND AN AMMONIUM HALIDE
Robert T. Dowd, Pasadena, Tex., assignor to Shell Oil Company, New York, N.Y., a corporation of Delaware
No Drawing. Filed Apr. 22, 1964, Ser. No. 361,898
3 Claims. (Cl. 260—2.5)

This invention relates to foamed epoxy resins. More particularly it relates to improved curing agent compositions, adapted to cure foamable polyepoxide compositions.

For the sake of consistency of nomenclature, the term "epoxy resin" herein refers to a cured, thermoset resin composition, obtained by reaction of a curing agent with a "polyepoxide." The term "polyepoxide" refers to compounds or mixtures of compounds containing an average of more than one oxirane group per molecule, sufficient to permit cross-linking through the oxirane groups to form useful thermoset resins.

Epoxy resins are a family of thermoset resins which have achieved a variety of commercial uses. They are useful, inter alia, in so-called "foamed," "expanded," or "cellular" condition. Cured compositions of this type are generally referred to herein as foamed epoxy resins or resin compositions, or epoxy resin foams.

This invention is concerned only with production of foamed epoxy resins by methods in which expansion or blowing of the foamable polyepoxide composition immediately precedes, or overlaps in time with, curing of the expanded composition. More specifically this invention is directed to so-called "foam-in-place" compositions which are produced by admixing a liquid composition comprising polyepoxides and volatile foaming agent, such as a chlorofluorocarbon, with a curing composition containing boron trifluoride or a complex of boron trifluoride. Such "foam-in-place" compositions and their preparation are described, for example, in U.S. 3,051,665 to Wismer et al., in U.S. patent application Ser. No. 156,494 of Carey et al., filed Dec. 1, 1961, and in British Patent 912,967. The disclosures of these patents are incorporated herein by reference. The person skilled in the art of producing foamed epoxy resins will know what polyepoxides, foaming agents and the like are suitable for use in producing foamed epoxy resins, and only brief mention will be made herein of this known background of the invention.

The use of boron trifluoride or one of its complexes as curing agent generally results in extremely rapid initiation of foaming upon mixing of the polyepoxide composition with the curing agent. It has been found that such extremely rapid foam initiation is often objectionable. This is found, for example, in those instances where it is desired to fill a large mold with foamable composition and close the mold before substantial foaming takes place, or in instances where it is desired to mix foamable composition by hand and place it into the location where the foam is needed. The time lag between mixing of expandable polyepoxide composition with curing agent and observable expansion of the mixture is herein designated "foam initiation time."

It is an object of this invention to provide a modified curing agent which permits controlled extension of the foam initiation time in the production of foamed epoxy resins. Another object is to provide a method of producing foamed-in-place epoxy resin foams in which the foam initiation time is controlled in the period of from 10 seconds to more than one minute.

Prior to this invention it had been found that the foam initiation time in producing epoxy foams cured with $BF_3$ or its complexes could be increased to some extent by the presence of controlled trace amounts of water in the curing agent. For example, the foam initiation time of a polyepoxide-trichlorofluoromethane composition admixed with a $BF_3$-polyethylene glycol curing agent was found to be only a few seconds in the substantial absence of water from the curing agent, but could be extended to 25 to 30 seconds with a controlled small amount of water in the curing agent. However, presence of water in the curing agent also has adverse effects on physical properties of the resulting epoxy foam, e.g., on dimensional stability; the water concentration should be held to 0.10% or less, basis total foam, for best foam properties.

This invention now provides a convenient and unobjectionable means for improved control of foam initiation time in production of epoxy resin foams from polyepoxide compositions and $BF_3$-containing curing agents. It permits extending foam initiation time by as much as one minute. Epoxy resin foams produced according to this invention do not have impaired physical properties.

This invention is based on the entirely unexpected finding that the presence of ammonium bromide in a $BF_3$-containing curing composition causes a delay in onset of foaming upon mixing of the curing composition with a foamable polyepoxide composition.

Accordingly, one mode of this invention is an improved curing composition which is capable of causing foaming and cure of liquid foamable polyepoxide compositions and which provides a controlled delay in foam initiation. The curing composition comprises as essential components boron trifluoride, either as such or combined in an organic complex, and a predetermined amount of an ammonium halide, suitably in the range from 10 to 150 parts by weight per 100 parts of boron trifluoride.

Another mode of this invention is a method for producing foamed-in-place epoxy resin foams by intimately admixing a liquid foamable polyepoxide composition with a curing agent composition of the kind described in the previous paragraph.

MATERIALS USED

*Polyepoxides*

The polyepoxides employed in preparing foamable compositions may be saturated or unsaturated, aliphatic, cycloaliphatic, aromatic or heterocyclic and may be substituted with substituents such as chlorine, hydroxyl groups, ether radicals and the like. They may be monomeric or polymeric. They may be of a single type or may be mixtures of several different types or molecular weights.

The foamable composition is in each case a liquid. All the epoxy compounds therein may be normally liquid or some may be normally solid. For purposes of describing and claiming this invention, normally liquid polyepoxides are those having a Durrans mercury method softening point up to about 30° C.; normally solid polyepoxides are those which have a higher softening point.

The polyepoxides that are preferred as major ingredient of the foamable compositions are the polyglycidyl ethers, and particularly the normally liquid polyglycidyl ethers of polyhydric phenols or polyhydric alcohols. The term "polyhydric" comprises compounds having two or more hydroxyl groups per molecule. Especially preferred are the polyglycidyl ethers of polyhydric phenols obtained by reacting epichlorohydrin with 2,2-bis(4-hydroxyphenyl)propane. The preparation of such polyepoxides is shown, for example, in U.S. 2,633,458 to Shokal. Polyether A and polyether B of that patent are typical of polyepoxides used with the curing agents of this invention.

Other useful polyepoxides are illustrated in some detail in the above-mentioned patents. Reference may also be made to the book "Epoxy Resins—Their Applications and Technology" by Lee et al., McGraw-Hill Book Company, Inc., 1957.

Blowing agents

A second essential ingredient of expandable compositions employed with the curing agents of this invention is an expansion-providing fluid or "blowing agent." The blowing agent should be compatible with the polyepoxide composition while the latter is in the liquid state and should, at the elevated temperature which results from the exothermic curing reaction, liberate a gas or vapor which causes the foaming effect. The normal boiling point of suitable fluid blowing agent may be below atmospheric temperature, provided the fluid is sufficiently soluble in the polyepoxide composition so that it does not vaporize therefrom as long as the composition itself is at its storage temperature and pressure, which is ordinarily atmospheric temperature and pressure.

The boiling point of the fluid blowing agent may be between about −30° and 100° C., and is preferably between about 0° and about 50° C. Blowing agents having boiling points in the higher part of the range, e.g., from 60° to 100° C. generally require some extraneous heat to secure full expansion, in addition to the heat developed during the curing process of the mixture. If desired, mixtures of blowing agents may be employed in which a lower boiling fluid provides the initial expansion and a higher boiling fluid provides further substantial expansion as the temperature of the total mixture rises.

The chemical composition of the blowing agent fluids is not of importance so long as the fluids are inert, i.e., not reactive with the remaining components of the resin mixture. Suitable fluids, for example, are hydrocarbons such as pentanes, hexanes, cyclohexane, petroleum ether or the like, and substituted hydrocarbons such as alcohols and halo-hydrocarbons. Some compounds which can be dissolved in the polyepoxide mixtures to provide expansion by vaporization at elevated temperatures may have relatively high melting points, so that they are normally solids. The term "vaporizable fluids" includes such compounds when present in solution in the expandable composition.

Preferred vaporizable fluids are polychlorofluoroalkanes. Particularly preferred are those polychlorofluoromethanes which have boiling points in the desired range, e.g., trichlorofluoromethane. A series of such compounds is available under the trademarks "Freon" and "Genetron." Table 1 lists several such compounds which are suitable for use in the present invention. Other materials of this series which have boiling points near or above atmospheric temperature may also be employed.

TABLE I

| "Freon" | "Genetron" | Formula | Boiling Point (° C.) |
| --- | --- | --- | --- |
| "Freon–11" | "Genetron–11" | $CCl_3F$ | +23.7 |
| "Freon–12" | "Genetron–12" | $CCl_2F_2$ | −29.8 |
| "Freon–21" | | $CHCl_2F$ | +8.9 |
| "Freon–114" | "Genetron–316" | $CClF_2$—$CClF_2$ | +3.5 |
| "Freon–112" | "Genetron–112" | $CCl_2F$—$CCl_2F$ | +92.8 |
| "Freon–113" | "Genetron–113" | $CCl_2F$—$CClF_2$ | +47.6 |

Surfactants

For best results it is necessary to include a surface active agent in the expandable polyepoxide composition. This generally serves to decrease the surface tension of the composition and thereby promote increased expansion, smaller cells, and more uniform cell size and texture of the expanded product. If conventional surface-active agents are to be employed, those of the nonionic type are preferred. Suitable, for example, are materials which are commercially available under the trademarks "Pluronic," "Span" and "Tween." The "Pluronics" are condensates of polypropylene glycol with ethylene oxide. The "Spans" are partial esters of the common fatty acids (lauric, palmitic, stearic and oleic) and "Hexitole" anhydrides (hextitans and hexides) derived from sorbitol; the "Tweens" are derived from the "Span" products by adding polyoxyethylene chains to the non-esterified hydroxyl groups. Illustrative of conventional non-ionic detergents suitable for use in this invention are polyoxyethylene sorbitan monolaurate (Tween–20) and polyoxyethylene sorbitan monostearate (Tween–60). Suitable surfactants can be selected from those described in the article entitled "Synthetic Detergents," by John W. McCutcheon, appearing in "Soap and Chemical Specialties" of July, August, September, and October 1955, revised and brought up to date in the December 1957, and January through April 1958 issues of the same journal.

Surfactants of this type are preferably added to the foamable polyepoxide compositions, but may also be added to the curing agent composition.

In an especially preferred modification, the conventional surfactant is replaced by a small amount of an epoxy ester, most preferably an epoxy ester of dimers and trimers of long chain, unsaturated acids as described, for example, in U.S. Patent No. 2,940,986 to Newey. Use of such epoxy esters in low concentration, e.g., as little as 0.5 to 0.75%, based on the polyepoxide, provides the same improvement in foam structure that is otherwise obtained by use of a conventional surfactant. The major advantage in using epoxy esters in lieu of conventional surfactants is that the esters, by virtue of the presence of epoxy groups, become part of the cured resin structure. The use of such esters in substantial amounts, e.g., above about 2% based on resin provides improved flexibility or resilience of the foam products in addition to providing the desired surfactant effect.

Other ingredients

Other ingredients may be present in the expandable polyepoxide compositions, if desired. These include, for example, thixotropic agents, plasticizers, pigments, dyes, fillers, lubricants and the like.

Compounds which do not themselves significantly effect the curing reaction but which impart desired properties to the resin foam may be added to the curing agent. For example, partially halogenated esters of phosphoric acid, e.g., tris(2,3-dibromopropyl)-phosphate or the corresponding chlorine compound may be added for the purpose of producing fire retardant foamed epoxy resin compositions.

Curing agent

The essential catalytic ingredient of the curing agent composition of this invention is boron trifluoride. It is preferably employed in the form of an addition product, also called a complex or coordination compound, of boron trifluoride with water or with organic compounds. The boron trifluoride or boron trifluoride complex is preferably employed in solution in a suitable solvent, most preferably in a polyhydric polyether such as polyethylene glycol.

Many complexes of boron trifluoride are described in the chemical literature. Some are described in "Boron Trifluoride and Its Derivatives," by Booth, published by John Wiley and Sons, 1949. Selections for use in the practice of this invention may be made from that publication, and particularly from chapter 4 thereof.

Boron trifluoride complexes or coordination compounds which may thus be useful comprise the monohydrate, the dihydrate, and the trihydrate of boron trifluoride; boron trifluoride etherates such as the 1:1 addition compound of boron trifluoride and diethyl ether, di-n-butyl ether, or other simple ethers; the complexes of boron trifluoride with carboxylic acids and anhydrides of carboxylic acids, such as acetic and propionic acid or acetic anhydride and succinic anhydride; the complexes of boron trifluoride with phenols, such as the complex of boron trifluoride with phenol, cresol, hydroquinone, or 2,2-bis(4-hydroxyphenyl)propane; complexes of boron trifluoride with liquid monohydric alcohols, such as methyl alcohol, ethyl alcohol, propyl alcohol, isopropyl alcohol, butyl alcohol and hexyl alcohol; compexes of boron trifluoride with liquid dihydric or polyhydric alcohols such as ethylene glycol, diethylene glycol, triethylene glycol or polyethylene glycols having molecular weights up to about 800; mixtures or complexes of boron trifluoride with esters such as ethyl acetate and methyl acetate; mixtures or complexes of boron trifluoride with ketones, such as acetone or methyl ethyl ketone; mixtures of boron trifluoride with chlorinated hydrocarbons, such as chloroform; mixtures of boron trifluoride with organic phosphites, such as triphenyl phosphite; and others.

Particularly preferred as curing agent for use in this invention is a 1:1 complex of boron trifluoride and diethyl ether, in solution in a polyethylene glycol having a molecular weight in the range from about 200 to about 600.

The boron trifluoride or boron trifluoride complex is dissolved in an appropriate organic liquid vehicle or solvent. The solvent may be an excess of the same compound used in forming the complex. The complex may also be dissolved in an added solvent which itself may or may not be a complex-forming agent. The solvent of the complex preferably is at least partially soluble or emulsifiable with the polyepoxide composition.

*Ammonium halide*

The catalyst composition, consisting of (a) a solution of boron trifluoride or (b) a liquid complex of boron trifluoride or (c) a solution of a complex of boron trifluoride, contains as added ingredient an ammonium halide. The best results have been obtained with ammonium bromide. Good results have also been obtained with ammonium chloride and ammonium iodide, although a somewhat larger amount of the iodide is required. Useful results may also be obtained by substituting ammonium fluoride, but it will generally be avoided because of its reported toxicity.

*Gaseous foam nucleating agent*

Admixture of a small amount of a normally gaseous fluid with the liquid compositions of this invention, either before the addition of curing agent or simultaneously with the addition of curing agent, results in particularly good foams. The technique of incorporating a small amount of finely divided gas in a liquid prior to expansion thereof is called nucleation. The nucleating fluid is present only in a relatively small proportion compared to the expansion-providing fluid; it is thought to provide centers around which a large number of foam bubbles may subsequently be formed by vaporization of the expansion-providing fluid. The nucleating fluid may suitably be air, nitrogen or another inert gas or it may be a compound of the same type as the expansion-providing fluid but which has a low boiling point, e.g., dichlorodifluoromethane. The volume of the liquid resin mass after nucleation but before expansion due to volatilization of the expansion-providing liquid is suitably from 1.1 to 2 times its volume before nucleation. Preferably it is not above 1.5 times the original volume.

Beating of liquid foamable compositions in air, either manually or by use of a mechanical mixer, as in adding the curing agent, serves to incorporate sufficient air into the liquids to provide adequate nucleation. As an alternative thereto, a small proportion of a low boiling vaporizable liquid such as dichlorodifluoromethane may be incorporated into the total liquid composition. Incorporation of the curing agent into such a mixture may then take place in the absence of added air or similar gas.

METHODS OF PREPARING RESIN FOAMS

Methods suitable for producing foamed epoxy resin compositions according to this invention are described in substantial detail in the above-mentioned patents U.S. 3,051,665 and British 912,967. Generally the suitable methods comprise combining two liquids, namely, (a) a composite which contains a suitable polyepoxide, a volatilizable fluid dissolved therein and any other of the above-referred-to ingredients desired to be included in the foamed resin composition, except the curing agent and ammonium halide, and (b) a liquid curing agent composition, consisting essentially of boron trifluoride or a complex of boron trifluoride, desirably in a solvent such as polyethylene glycol, and containing a predetermined amount of ammonium halide, calculated to provide the desired foam initiation time. The liquid polyepoxide composition and liquid curing agent composition are rapidly and completely blended and the resulting liquid mass placed in the location where the foamed resin is desired. Curing reactions which occur upon blending of the curing agent with the polyepoxide composition result in the development of exothermic heat, which raises the temperature of the mixture. The proportions and types of components are selected such that the temperature of the blended composition, which originally is below the vaporization temperature of the vaporizable fluid, rises to a point at which vaporization of the fluid contained in the polyepoxide mass occurs, with the result that the fluid vaporizes and so expands the mixture. Since the vaporization of the fluid is in itself an endothermic process, a stabilization of the temperature of the mixture occurs with the result that the heat released by the curing reaction does not cause an excessive rise in the temperature of the reaction mass. The curing reaction proceeds while the mass is in an expanded and heated condition, the polyepoxide gelling and curing to the desired hard resin during this period. Because of the gradual change in the composition of the resin during cure, the solubility of the vaporizable fluid in the resin mass decreases; further vaporization is therefore facilitated both by the elevated temperature of the resin mass and by the decreasing solubility of the vaporizable fluid therein.

The procedure for admixing curing agent composition and foamable polyepoxide composition can be completely manual, partly manual, or completely mechanized. For example, both mixing and dispensing of the mixture may be manual, or mixing may be by mechanical agitation and dispensing manual, or both mixing and dispensing may be mechanical such as by a mixing and dispensing machine.

As described, foamed epoxy resins are produced according to this invention by admixing a liquid polyepoxide composition with a liquid curing agent-containing composition. Optionally a nucleating fluid may be separately mixed as a third component. While some of the other optional ingredients may also be admixed separately it is ordinarily preferred to incorporate them in one or the other of the two major liquid compositions.

*Proportions and conditions*

The following paragraphs are concerned with proportions of ingredients, with conditions, and with product properties. Unless otherwise indicated, percentages and parts are by weight. The abbreviation "phr." means parts per hundred parts of resin, and is based on the total weight of polyepoxides in the composition.

The major components of the liquid polyepoxide composition are the liquid polyepoxide itself and the volatilizable fluid. The proportions of these ingredients are selected to produce a foam having the desired density.

The blowing agent is ordinarily employed in a concentration in the range from about 5 to about 40% by weight of tthe liquid polyepoxide composition. Amounts in the range from 5 to 25% by weight are suitably employed in the production of foams of relatively high density and amounts in the range from 10 to 40% by weight in the production of foams of relatively low density.

When conventional surfactants are employed, they are ordinarily added in the range from 0.1 to 5 phr.

When polyglycidyl esters of long chain, unsaturated acids are employed to provide the surfactant properties, they are added to the polyepoxide mixture in an amount which is preferably in the range from 0.5 to 3 phr. Sufficient surfactant effect is provided by amounts of as little as 0.5 to 0.75 phr. Amounts in excess of 2 phr. have the further advantage of reducing the stiffness of rise of the foam, i.e., of providing a somewhat more fluid composition during the expansion of the foam. Amounts in excess of 3 phr., and particularly those in excess of 5 phr., provide foams which have substantial resiliency and flexibility, increasing with increasing amounts of ester. At the same time, foams produced with more than 3 phr. of ester are less preferred for some uses such as, for example, in thermal insulation.

When a solvent for the polyepoxide is added to the polyepoxide composition it is suitably selected in a proportion to provide a desirable solution viscosity. The viscosity of the liquid polyepoxide composition for use in this invention, i.e., containing the polyepoxide and the volatile fluid foaming agent should generally be the range from 5 to 500 poises at 23° C. and is preferably in the range from 20 to 60 poises at 23° C.

When thixotropic agent is added to the polyepoxide composition it is suitably present in the range from 0.2 to 12 phr. Thixotropic agents of the bentonite type are preferably present in the range from 1.5 to 7 phr. and those of the metallic soap powder type in the range from 0.5 to 5 phr.

When separate nucleating fluid is added it is preferably present in the range from 0.1 to 5 mole percent based on the fluid foaming agent and preferably less than 3 mole percent thereof.

The proportion of curing agent added is predetermined to provide the desired rate and degree of curing. The proportion of $BF_3$ suitably is in the range from 0.1 to 10 phr.

The amount of $BF_3$ combined with complexing agent may be in the range from 1 to 70 percent by weight of the complex. The amount of $BF_3$ present in the liquid solution which is employed as the curing agent is suitably in the range from 1 to 20% by weight, and preferably in the range from 5 to 15%. The remainder of the curing composition consists essentially of complexing agent, diluent, and ammonium halide.

Water may sometimes be unavoidably present in the polyepoxide mixture or the curing agent. The proportion of water should be held to less than 0.10 percent of the total reaction mixture and preferably less than 0.05 percent.

In the practice of this invention the polyepoxide composition and curing agent are generally mixed at ambient temperature. However, some control over the foam initiation time, degree of cure and the like can be exercised by cooling or heating one or both compositions, preferably the liquid polyepoxide compositions, e.g., in the range from 0 to 60° C. and preferably in the range from 15 to 35° C.

The maximum temperature reached during curing may be as high as 220° C.; ordinarily the maximum temperature is about 165° C. in the production of low density foams and about 190° C. in the production of high density foams.

Foaming of the mixture of polyepoxide and curing agent according to this invention generally begins in from 30 seconds to 4 minutes after admixing of the two compositions. Curing is generally complete within no more than 10 minutes from foam initiation and usually within 2 to 4 minutes. Curing of the foams is generally complete without application of external heat; if desired, a post cure at a temperature in the range from 75° C. to 250° C. may be employed.

Foams produced according to this invention generally have a cell size in the range from 0.05 to 3 millimeters in the case of normal foams and of up to 15 mm. in the case of highly expanded low density foams. It is preferable to produce foams having a substantially uniform cell size of about 0.1 mm.

Foam densities may range from one pound per cubic foot to 20 pounds per cubic foot or higher. The compressive strength of the foams is mainly a function of the foam density. Foams of about 3 pounds per cubic foot density have compressive strengths of about 50 p.s.i.; those of 10 pounds per cubic foot of about 250 p.s.i.; and those of 15 pounds per cubic foot density about 550 ps.i.

Thermal conductivity of foams produced with polychlorofluorocarbons generally is in the range from 0.1 to 0.4 B.t.u./hr./° F./sq. ft./in.

EXAMPLES

The novel aspect of this invention, namely, the controlled delay of foam initiation time due to the presence of ammonium halide in a $BF_3$-containing curing agent, is illustrated in the following examples.

The illustrative compositions comprise the following materials:

*Polyepoxide A.*—A mixture of reaction products of epichlorohydrin and bisphenol A, similar to polyethers A and B of U.S. 2,633,458, and characterized by a weight per epoxide value of 220–225.

*Polyepoxide B.*—A polyglycidyl ester of a mixture of dimer and trimer of long chain unsaturated aliphatic acids similar to polyepoxide G of British 912,967, and characterized by a weight per epoxide value of about 400, and a hydroxyl value of 0.019.

*Boron trifluoride-diethylether complex.*—A liquid complex prepared by adding $BF_3$ gas to liquid diethylether in a 1:1 molar ratio.

*Polyether.*—A commercial polyethylene glycol having a molecular weight of about 200 and characterized by the following properties:

| | |
|---|---|
| Hydroxyl number | 576 |
| Refractive index at 20° C. | 1.459 |
| Specific gravity at 20° C. | 1.1270 |
| Viscosity SUS at 210° F. | 40.3 |

The illustrative liquid polyepoxide composition employed in producing foam consists of 80 parts polyepoxide A, 3 parts polyepoxide B, and 17 parts trichlorofluoromethane. It has a viscosity in the range from 30–40 poises at 25° C.

A liquid curing agent composition designated "A" consists of 17 parts of a 1:1 molar ratio complex of boron trifluoride and diethyl ether, dissolved in 83 parts of polyether. The $BF_3$ content of the curing agent composition is 8.1 percent by weight. Its water content is held sufficiently low so that it represents from 0.05 to 0.08 percent by weight of the total foamable resin composition.

Curing agent compositions B and C are prepared by adding to curing agent composition A two parts and four parts, respectively, of ammonium bromide per 100 parts of composition A. The salt dissolves in the compositions.

Curing agents D and E are similarly prepared by adding two parts and four parts of ammonium chloride per 100 parts of composition A, and curing agents F, G, and H by adding four, six and eight parts of ammonium iodide.

Example 1

A series of runs are made in which foam is prepared by handmixing in a suitable small container predetermined amounts of curing compositions A, B and C, respectively, with the liquid polyepoxide composition. Curing composition A is admixed in a ratio of 2.7 phr., composition B in a ratio of 2.8 phr., and composition C in a ratio of 2.9 phr. The temperature of the components is controlled. Foam initiation times for the several mixtures are observed at several starting temperatures. Plotting initiation time in seconds against temperature on rectangular coordinate paper results in separate straight line graphs for each curing agent. The data in Table 2 are taken from such graphs:

TABLE 2

|  | Curing Agent | | |
|---|---|---|---|
|  | A | B | C |
| Properties of Curing Composition, phr. | 2.7 | 2.8 | 2.9 |
| NH₄Br in Curing Composition: | | | |
| Percent wt., basic curing composition | 0 | 2 | 4 |
| Percent wt., basic BF₃ | 0 | 24.8 | 49.5 |

| Temperature, °F. | Initiation Time | | |
|---|---|---|---|
| 70 | 35 | 48 | 70 |
| 80 | 22 | 32 | 47 |
| 90 | 10 | 15 | 27 |

Foams produced with as much as 4 percent ammonium bromide in the curing agent have properties which are essentially identical to those of foams similarly prepared without ammonium bromide, as illustrated in Table 3.

TABLE 3

| Curing agent | A | B |
|---|---|---|
| Foam Density, lb./ft.³ | 1.70 | 1.79 |
| Compressive Strength, p.s.i. | 15.0 | 17.1 |
| Initial K-factor, B.t.u./hr.-ft.² (° F./in.) | 0.119 | 0.122 |

*Example 2*

Foamed resins are similarly prepared from curing compositions D through H. Results of individual runs are reported in Table 4.

TABLE 4

|  | Curing Agent | | | | | |
|---|---|---|---|---|---|---|
|  | A | D | E | F | G | H |
| Proportion of Curing Composition, phr | 2.7 | 3.1 | 3.3 | 3.2 | 3.4 | 3.6 |
| Ammonium Halide in Curing Composition | (¹) | (¹) | (¹) | (²) | (²) | (²) |
| Percent wt., basic curing composition | 0 | 2 | 4 | 4 | 6 | 8 |
| Percent wt., basic BF₃ | 0 | 24.8 | 49.5 | 49.5 | 74.3 | 89.0 |

| Temperature, °F | Initiation Time | | | | | |
|---|---|---|---|---|---|---|
| 80 | 22 | 33 | 50 | 30 | 37 | 55 |
| 85 | 17 | 25 | 37 | 24 | 30 | 43 |
| 90 | 10 | 17 | 25 | 17 | 22 | 32 |

¹ NH₄Cl.  ² NH₄I.

The properties of the foam produced with ammonium chloride and iodide, as illustrated in Table 4, do not differ significantly from those illustrated in Tables 2 and 3.

Similar beneficial effects of adding ammonium halide to the curing agent composition are observed when other BF₃ complexes are employed as curing agents in runs such as illustrated in Examples 1 and 2, and when other changes are made in the foamable polyepoxide composition or the curing agent composition. A number of typical compositions which can be modified according to this invention are described in the above-mentioned U.S. patent to Wismer et al. and British patent.

I claim as my invention:
1. In the method of producing foamed epoxy resin compositions wherein there are blended
   (A) a liquid polyepoxide composition comprising
      (a) a polyepoxide capable of being cured to a thermoset resin; and
      (b) a vapor generating fluid which is completely soluble in said composition at ambient temperatures and atmospheric pressure but volatilizes therefrom at elevated temperatures; and
   (B) a liquid curing composition comprising a curing agent selected from the group consisting of boron trifluoride and coordination complexes of boron trifluoride;
the improvement which comprises controlling the time interval between blending of said liquid compositions and foam rise by incorporating in said curing composition, prior to said blending step, an amount of an ammonium halide in the range from 10 to 150 percent by weight, based on boron trifluoride.

2. The method according to claim 1 wherein said ammonium halide is ammonium bromide, and said amount is in the range from 10 to 50 percent by weight based on boron trifluoride.

3. The method according to claim 1 wherein said polyepoxide composition comprises essentially a liquid resin resulting from the reaction of epichlorohydrin and 2,2-bis (4-hydroxyphenyl)propane, and trichlorofluoromethane, and said curing composition comprises essentially a 1:1 molar complex of boron trifluoride and diethyl ether, a polyethylene glycol having a molecular weight between 200 and 600, and from 10 to 50 percent by weight of ammonium bromide, based on boron trifluoride.

References Cited

UNITED STATES PATENTS

| 2,451,018 | 10/1948 | Burk | 252—433 |
| 2,839,495 | 6/1958 | Carey | 260—47 |
| 3,051,665 | 8/1962 | Wismer et al. | 260—2.5 |
| 3,080,341 | 3/1963 | Chenicek et al. | 260—47 |
| 3,206,525 | 9/1965 | Michaels | 252—433 |
| 3,282,863 | 11/1966 | Carey et al. | 260—2.5 |

MURRAY TILLMAN, *Primary Examiner.*

J. C. BLEUTGE, *Assistant Examiner.*